US010097558B2

(12) United States Patent
Roth et al.

(10) Patent No.: US 10,097,558 B2
(45) Date of Patent: *Oct. 9, 2018

(54) DELEGATED PERMISSIONS IN A DISTRIBUTED ELECTRONIC ENVIRONMENT

(71) Applicant: Amazon Technologies, Inc., Reno, NV (US)

(72) Inventors: Gregory Branchek Roth, Seattle, WA (US); Daniel Stephen Popick, Seattle, WA (US); Bradley Jeffery Behm, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/237,352

(22) Filed: Aug. 15, 2016

(65) Prior Publication Data
US 2016/0352753 A1    Dec. 1, 2016

Related U.S. Application Data

(63) Continuation of application No. 13/760,738, filed on Feb. 6, 2013, now Pat. No. 9,418,213.

(51) Int. Cl.
*H04L 29/06* (2006.01)
*G06F 21/31* (2013.01)
(Continued)

(52) U.S. Cl.
CPC ............ *H04L 63/105* (2013.01); *G06F 21/31* (2013.01); *G06F 21/335* (2013.01);
(Continued)

(58) Field of Classification Search
CPC ......... H04L 63/105; H04L 63/08; H04L 9/32; H04L 9/3202; G06F 21/6218;
(Continued)

(56) References Cited

U.S. PATENT DOCUMENTS 7,349,929 B2 *  3/2008  Pfitzner ..................... G06F 8/71
7,831,682 B2   11/2010  Certain et al.
(Continued)

OTHER PUBLICATIONS

USPTO Non-Final Office Action dated Jan. 16, 2015, for U.S. Appl. No. 13/760,769.
(Continued)

*Primary Examiner* — Joseph P Hirl
*Assistant Examiner* — J. Brant Murphy
(74) *Attorney, Agent, or Firm* — Hogan Lovells US LLP

(57) ABSTRACT

Permissions can be delegated to enable access to resources associated with one or more different accounts, which might be associated with one or more different entities. Delegation profiles are established that are associated with at least one secured account of at least one customer. Each delegation profile includes information such as a name, a validation policy that specifies principals which may be external to the account and which are permitted to assume the delegation profile, and an authorization policy that indicates the permitted actions within the account for those principals which are acting within the delegation profile. Once a delegation profile is created, the profile can be available for external principals or services that provide a user credential delegated access under the account, where that credential is provided by a trusted identity service. Access can be provided across accounts using the user credential.

20 Claims, 8 Drawing Sheets

(51) Int. Cl.
  *G06F 21/33* (2013.01)
  *G06F 21/62* (2013.01)
  *G06Q 20/06* (2012.01)

(52) U.S. Cl.
  CPC .......... *G06F 21/6218* (2013.01); *H04L 63/08* (2013.01); *G06Q 20/06* (2013.01); *G06Q 2220/00* (2013.01)

(58) Field of Classification Search
  CPC .... G06F 21/335; G06F 21/31; G06F 21/3218; G06Q 20/06; G06Q 2220/00
  See application file for complete search history.

(56) References Cited

U.S. PATENT DOCUMENTS

| | | | | |
|---|---|---|---|---|
| 8,028,325 | B2* | 9/2011 | Cahill | G06Q 10/10 726/2 |
| 8,275,672 | B1* | 9/2012 | Nguyen | G06Q 30/0635 705/26.1 |
| 8,458,335 | B2 | 6/2013 | Holzer | |
| 8,468,359 | B2* | 6/2013 | Morris | H04L 9/3257 713/175 |
| 8,468,609 | B2* | 6/2013 | Leggette | G06F 11/1004 709/216 |
| 8,627,438 | B1* | 1/2014 | Bhimanaik | H04L 63/10 726/9 |
| 2002/0091745 | A1* | 7/2002 | Ramamurthy | G06F 17/30867 718/100 |
| 2002/0174048 | A1 | 11/2002 | Dheer | |
| 2003/0149781 | A1* | 8/2003 | Yared | G06F 21/41 709/229 |
| 2004/0139318 | A1* | 7/2004 | Fiala | G06Q 20/3558 713/165 |
| 2005/0097350 | A1* | 5/2005 | Patrick | G06F 21/6218 726/26 |
| 2005/0097352 | A1* | 5/2005 | Patrick | H04L 63/20 726/26 |
| 2006/0021018 | A1* | 1/2006 | Hinton | H04L 63/06 726/10 |
| 2006/0075475 | A1* | 4/2006 | Boulos | G06F 21/33 726/6 |
| 2006/0129817 | A1* | 6/2006 | Borneman | G06F 21/41 713/170 |
| 2006/0224470 | A1 | 10/2006 | Garcia Ruano | |
| 2007/0027961 | A1* | 2/2007 | Holzer | G06Q 30/02 709/219 |
| 2007/0089167 | A1 | 4/2007 | Villavicencio | |
| 2007/0101145 | A1* | 5/2007 | Sachdeva | H04L 63/0815 713/176 |
| 2007/0143860 | A1* | 6/2007 | Hardt | G06F 21/6254 726/28 |
| 2007/0204016 | A1* | 8/2007 | Kunz | G06Q 10/06 709/223 |
| 2007/0233540 | A1* | 10/2007 | Sirota | G06Q 10/06315 705/7.25 |
| 2007/0254631 | A1* | 11/2007 | Spooner | G06F 21/6218 455/411 |
| 2008/0005573 | A1* | 1/2008 | Morris | H04L 9/3257 713/180 |
| 2008/0010665 | A1* | 1/2008 | Hinton | G06F 21/41 726/1 |
| 2008/0046984 | A1* | 2/2008 | Bohmer | H04L 63/0853 726/5 |
| 2008/0059804 | A1* | 3/2008 | Shah | G06F 21/41 713/186 |
| 2008/0134311 | A1* | 6/2008 | Medvinsky | G06F 21/33 726/7 |
| 2008/0201186 | A1* | 8/2008 | Poon | G06Q 10/06375 705/14.69 |
| 2009/0064284 | A1* | 3/2009 | Poston | G06F 21/10 726/4 |
| 2009/0083225 | A1* | 3/2009 | Jacobs | G06Q 30/02 |
| 2009/0254978 | A1* | 10/2009 | Rouskov | G06F 21/335 726/4 |
| 2009/0265765 | A1 | 10/2009 | Vogler | |
| 2009/0328178 | A1* | 12/2009 | McDaniel | G06F 21/31 726/9 |
| 2010/0036931 | A1* | 2/2010 | Certain | G06F 11/1451 709/214 |
| 2010/0100924 | A1* | 4/2010 | Hinton | G06F 21/10 726/1 |
| 2010/0107225 | A1* | 4/2010 | Spencer | H04L 63/0876 726/4 |
| 2010/0125894 | A1 | 5/2010 | Yasrebi | |
| 2010/0186082 | A1* | 7/2010 | Ladki | G06F 21/335 726/19 |
| 2010/0269156 | A1 | 10/2010 | Hohlfeld | |
| 2010/0319068 | A1* | 12/2010 | Abbadessa | H04L 63/102 726/21 |
| 2011/0225637 | A1* | 9/2011 | Counterman | G06F 21/6245 726/7 |
| 2011/0231265 | A1* | 9/2011 | Brown | G06Q 30/02 705/14.73 |
| 2011/0239283 | A1* | 9/2011 | Chern | G06F 21/33 726/6 |
| 2012/0096533 | A1* | 4/2012 | Boulos | G06F 21/33 726/8 |
| 2012/0117229 | A1* | 5/2012 | Van Biljon | G06Q 30/04 709/224 |
| 2012/0117626 | A1* | 5/2012 | Yates | H04L 63/101 726/4 |
| 2012/0159577 | A1 | 6/2012 | Belinkiy | |
| 2012/0254957 | A1* | 10/2012 | Fork | G06F 21/33 726/6 |
| 2012/0278454 | A1* | 11/2012 | Stewart | H04L 67/34 709/220 |
| 2013/0067538 | A1* | 3/2013 | Dharmarajan | G06F 21/45 726/4 |
| 2013/0086210 | A1* | 4/2013 | Yiu | G06F 21/41 709/217 |
| 2013/0086211 | A1 | 4/2013 | Sondhi | |
| 2013/0086658 | A1* | 4/2013 | Kottahachchi | G06F 21/45 726/6 |
| 2013/0205360 | A1* | 8/2013 | Novak | H04L 63/102 726/1 |
| 2013/0276142 | A1* | 10/2013 | Peddada | G06F 21/62 726/28 |
| 2014/0020051 | A1* | 1/2014 | Lu | G06F 21/6218 726/1 |
| 2014/0137248 | A1* | 5/2014 | Gajda | G06F 21/00 726/23 |

OTHER PUBLICATIONS

USPTO Final Office Action dated Sep. 14, 2015, for U.S. Appl. No. 13/760,769.
USPTO Non-Final Office Action dated Feb. 1, 2016, for U.S. Appl. No. 13/760,769.
USPTO Notice of Allowance dated Jun. 16, 2016, for U.S. Appl. No. 13/760,769.
USPTO Non-Final Office Action dated May 9, 2014, for U.S. Appl. No. 13/760,738.
USPTO Final Office Action dated Aug. 29, 2014, for U.S. Appl. No. 13/760,738.
USPTO Non-Final Office Action dated Mar. 12, 2015, for U.S. Appl. No. 13/760,738.
USPTO Final Office Action dated Nov. 20, 2015, for U.S. Appl. No. 13/760,738.
USPTO Notice of Allowance dated Apr. 26, 2016, for U.S. Appl. No. 13/760,738.

* cited by examiner

DELEGATED PERMISSIONS IN A DISTRIBUTED ELECTRONIC ENVIRONMENT

CROSS-REFERENCES TO RELATED APPLICATIONS

This application is a continuation of allowed U.S. application Ser. No. 13/760,738, entitled "DELEGATED PERMISSIONS IN A DISTRIBUTED ELECTRONIC ENVIRONMENT," filed Feb. 6, 2013; of which the full disclosure of this application is incorporated herein by reference for all purposes.

BACKGROUND

In recent years, an ever-increasing number of applications and services have been made available over networks such as cellular networks and the Internet. Due to this, an increasing number of content and service providers are turning to technologies such as remote resource sharing and cloud computing. Cloud computing, in general, is an approach to providing access to electronic resources through services, such as Web services, where the hardware and/or software used to support those services is dynamically scalable to meet the needs of the services at any given time. A user or customer of a service provider will typically rent, lease, or otherwise pay for access to resources through the cloud, and thus does not have to purchase and maintain the hardware and/or software to provide access to these resources.

In this context, a large number of security concerns are faced by service providers and by their customers. Typically, the service provider wants to ensure that the resource infrastructure is secure and that their customers' services and data are protected. Similarly, the customer of the service provider needs to ensure that the provider has taken the proper security measures to protect their information against unauthorized use or access from end users or various other parties. Furthermore, in some cases, the customer may wish to delegate or share security privileges between multiple heterogeneous services and resources that reside within the service provider or in external networks. It is thus desirable to enable the customer to achieve such sharing of privileges in a trusted and secure manner.

BRIEF DESCRIPTION OF THE DRAWINGS

Various embodiments in accordance with the present disclosure will be described with reference to the drawings, in which.

DETAILED DESCRIPTION

Figure 1:
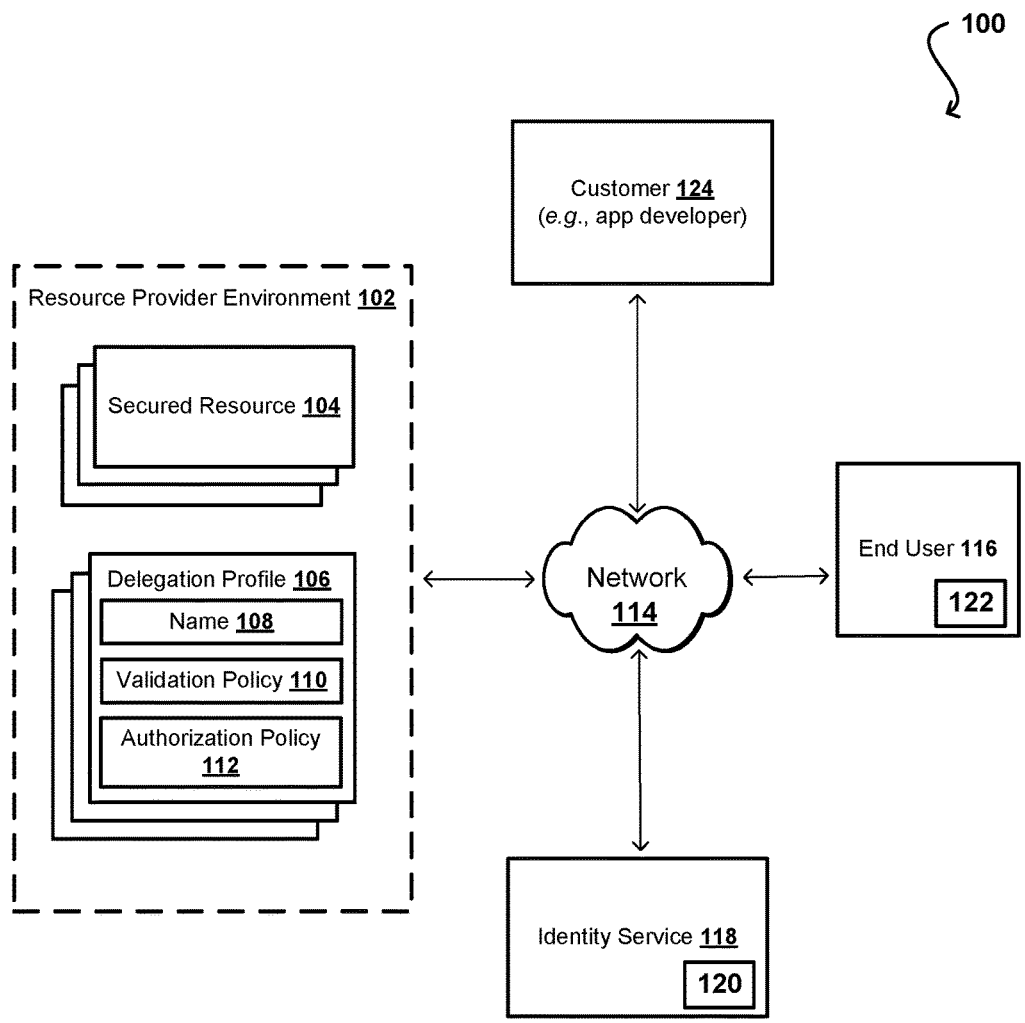
FIG. 1 illustrates an example environment in which aspects of the various embodiments can be implemented.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with the embodiments described herein overcome various deficiencies in existing approaches for delegating security rights and privileges for services and resources in an electronic and/or multi-tenant environment. In particular, the various embodiments provide approaches for using an internal and/or external entity to dynamically determine and authorize delegation of permissions to perform actions in, on, or against one or more secured accounts, where those accounts may be associated with a number of different entities and/or resource providers.

In accordance with various embodiments, a resource provider system can utilize a set of delegation profiles that can be created, selected, or applied for one or more accounts of at least one customer, where each customer has at least some level of access to one or more resources managed and/or offered by the system. In accordance with an embodiment, a delegation profile can include information such as (a) a name (or other identifier), (b) a validation policy that specifies one or more security principals (e.g., end users), or types of security principals, which may be external to the account and which are permitted to assume the delegation profile, and (c) an authorization policy specifying the permitted actions within the account for principals which are acting within the delegation profile. In some situations, a customer of the resource provider system might specify one or more policies, rules, or other criteria that can be evaluated to determine which delegation profile to apply to a specific principal, or to a request from that principal, etc.

Once a delegation profile has been created and assigned to a customer account, permission can be granted to the customer to use the delegation profile for enabling access to the respective resource(s). Thereafter, the customer can use the delegation profile by providing references to the delegation profile to external entities, such as end users or external services, or the customer can provide policies or rules that can be used to determine that the profile should be used for those end users, entities, or services. If an external entity is provided with a reference to the delegation profile, the entity can use the reference to obtain a set of credentials for performing certain actions in the account. For example, an end user can submit a request for credentials to an identity service, such as a security token service, where the request includes a reference to the delegation profile. The security token service can verify whether the end user is one of the security principals that were specified in the validation policy of the delegation profile. If the user was specified as a security principal, the security token service can provide the end user with a set of credentials. These credentials enable requests to be made within the security context of the delegation profile in the account, subject to the permissions that were specified in the authorization policy. If the end user was not provided with a reference to a delegation profile, the end user can submit a request without the reference and information included in the request can enable a determination of the proper delegation profile to apply. The determination can include, for example, performing a lookup based at least in part upon one or more aspects of the request and/or based at least in part upon one or more aspects of the end user. In some embodiments, the end user can be identified by a security service or federation provider indicated by the delegation profile. In other embodiments, the delegation profile can include a reference to a security service or other authority that is capable of identifying the users, or types of users, for which that delegation profile should be utilized. In some embodiments the permissions can be determined in accordance with one or more rules that map attributes asserted by the security service or other authority to one or more permissions elements.

In some embodiments, multiple customers of a resource provider system might have delegation profiles associated with a particular user. For example, a user might have an account with the resource provider system, and might utilize applications provided by one or more customers, where each of those applications is associated with a respective customer account. A user obtaining credentials from an identity service can provide a copy of those credentials, which can be associated with any user identifier associated with one of the accounts. Such an approach enables a user, having been verified by an identity service and having received credentials, to access resources under any of those accounts using the credentials from the identity service.

Similarly, one or more of those applications or customer resources might be able to gain access to resources associated with another account, where that access is provided via presentation of the credentials originally presented to the user. As an example, a user might have data stored to resources associated with an account of the user. If the user utilizes an application associated with a customer, where that application enables access using the credentials, that application might be able to access the user data stored under the user account through presentation of the credentials. In at least some embodiments, the amount and/or type of access might be different for a customer or application than for a user associated with an account, as a different delegation profile might apply. Further, costs for use of the resources might be different when accessed by a third party than when accessed by a user associated with the account.

Further, in at least some embodiments the user credentials might enable access between two applications or providers using the credentials for a user associated with those applications or providers. For example, a user might store information to resources associated with an account of a first customer. The user also might utilize an application associated with a second customer. In some embodiments, the user credentials might enable the application of the second customer to directly access data from the resources of the first customer, even though the first and second customers might not have a direct relationship and the first customer would not have access to the resources absent the presentation of the user credentials. In such cases, the amount and/or type of access, as well as payment for use of the resources, can differ, as may be configurable by any of a number of different parties, such as the user and/or either of the first and/or second customer.

Various other applications, processes, and uses are presented below with respect to the various embodiments.

FIG. 1 is a high level illustration of an environment 100 in which one or more delegation profiles can be selected and/or dynamically determined to enable a customer to delegate permissions to one or more end user devices or other external entities, in accordance with various embodiments. As illustrated, a resource provider environment 102 can include one or more secured resources 104 of various types, as may be used to support various services and/or applications. These resources can include physical and/or virtual resources, such as application or data servers or server instances, among other such resource types. A customer 124 of the resource provider environment 102 can obtain an account with the resource provider environment, enabling the customer 124 to access one or more of the secured resources 104 across at least one appropriate network 114. The customer in some embodiments can utilize these resources to support applications and services that might be utilized by one or more external entities 116, such as end users of those applications and services.

When an account is created for the customer, at least one delegation profile 106 can be created or otherwise associated with the account for the customer. The account is maintained by the resource provider environment on behalf of the customer, and the account can designate one or more principals of the customer 124 and a set of the shared resources (e.g., 104) that those principals can access and use. The delegation profile 106 can be created or selected by an authorized user (e.g., an administrator) associated with the account and/or customer. In accordance with an embodiment, an example delegation profile 106 includes a name 108 or identifier, at least one validation policy 110, and at least one authorization policy 112. The name 108 can be a string or any other identifier that is used to refer to the delegation profile. The validation policy 110 specifies which security principals, external entities, or other types of users are allowed to utilize the delegation profile to perform various actions on resources under the delegation profile. As discussed, the external entities or other can reside externally with respect to the customer and/or the account. In addition, the one or more authorization policies 112 can indicate which specific actions the various principals, entities, or users are allowed to perform (e.g., run instances, read or modify data, access other secured resources in the account etc.).

In accordance with an embodiment, a customer 124 associated with an account is able to provide the delegation profile to an external entity 106, such as an end user or a service. For example, the customer 124 may provide a reference to the delegation profile to the external entity 116. The external entity 116 can then obtain credentials 122 to act as an authorized user under the account by way of the delegation profile 106. For example, the external entity 116 may use the reference to the delegation profile 106 and request the credentials 122 from a security service 116, federation system, or other authorized entity that has access to a copy of the credentials 120. The security service (or other identity or federation management entity) can verify whether the validation policy defined in the delegation profile properly identifies the external entity 116 as being allowed to assume the delegation profile. If the external entity 116 is verified, the security service can issue the set of credentials 122 that can be used by the external entity to perform actions on resources 104 associated with the account, subject to the permissions specified in the authorization policy 110.

In this manner, customers are able to provide the delegation profile to various external entities (e.g., users, services, applications, etc.), and if those entities have been properly identified as security principals in the validation policy of the delegation profile then the entities are able to act in the account. This enables external entities to perform various actions on resources in the account which have been granted to them by the authorization policy, all without the need to make those external entities actual users of the account. This can provide a more efficient control model over the actions and actors that are able to access the resources of the account under the assumption of the delegation profile.

Figure 2:
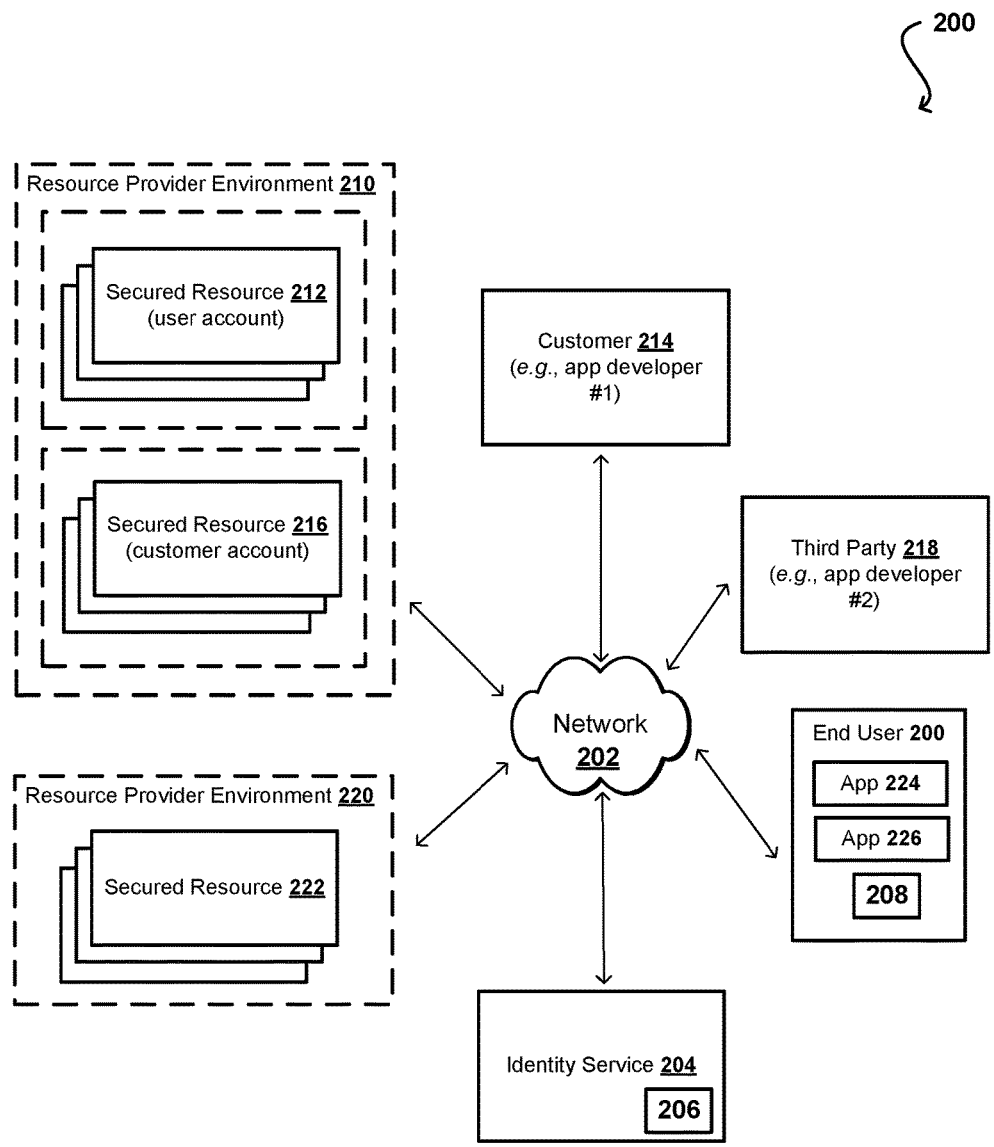
FIG. 2 illustrates another example environment in which aspects of the various embodiments can be implemented.

In some embodiments, credentials issued to a user by an identity service can enable the user to access resources under multiple accounts associated with different entities, as may be provided by multiple providers. For example, FIG. 2 illustrates another example environment 200 in which aspects of various embodiments can be implemented. As in FIG. 1, a user 200 can login to an identity service 204 across at least one network 228, and upon authentication can receive a set of credentials 208 that can be used to access resources associated with one or more accounts, providers, or other entities that are capable of utilizing those credentials to assign a delegation profile and/or provide access to the corresponding user. In this example, the identity service maintains a local copy 206 of information for the user, which can be used to authenticate the user and/or generate the credentials 208.

In this example, the end user 200 has an account with a resource provider that enables the user to access one or more secured resources 212 in a resource provider environment 210. The user could use these resources to, for example, store data such as images or music, backup various systems, perform computations or processing for one or more applications executing on a client device, or perform a number of other such operations. When the user attempts to access the secure resources 212 associated with the user account, the resource provider environment 210 can analyze information for the request, such as the IP address, signature, or other such information, as well as the credentials provided with the request. Based at least in part upon this information, the environment can determine the appropriate resources 212, and can apply the appropriate delegation profile for those credentials to enable a designated type and/or amount of access to those resources. In at least some embodiments, components of the environment 210 can also determine that the request likely came from the end user 202, or a device associated with the end user, and can determine a delegation profile that corresponds to the owner (i.e., the end user) of the account. In this way, the user can obtain the full amount of resource access allowed under the user account.

The user device 202 might also have a first application 224 stored thereon, for example, that is associated with a first application provider, who can also be a customer 214 of the resource provider environment 210. The customer 214 can have another set of secured resources 216 of the provider environment that are associated with an account of the customer. If the customer accepts the credentials from the identity service 204 for the end user 202, the application can submit requests to the customer's secured resources 216 in the provider environment 210. The request can include a copy of the credentials, as well as information such as an identifier for the application, an identifier for a delegation profile to be applied, or other such information. When the request is received to the provider environment 210, a component can determine the appropriate secured resources 216 under the account of the customer, and can enable the application to access those resources on behalf of the user. In at least some embodiments, the information for the request can be analyzed to determine an appropriate delegation profile for the application and/or request. The delegation profile for the application 224 might differ from a delegation profile for the customer 216 on the customer account, and in at least some embodiments can include a subset of the access as designated by the customer. As an example, the application might be able to access data stored for the end user, or process data for the end user, but might not be able to access data for other end users or application instances. A delegation profile for the customer, however, might enable the customer to access any or all of the data stored to the secured resources 216 under the customer account.

In the example thus far, the end user has been able to access secured resources 212 under a user account, and the application 224 has been able to access secured resources 216 under the customer account, each using the credentials 208 issued to the end user by the identity service 204. In each case the provider environment might have to map the credentials to a local identifier or other such information, but the credentials are used to obtain access in either case. The sharing of the credentials in at least some embodiments can also enable access across accounts, as allowed by an appropriate delegation profile, rule, or policy, etc. For example, the application 224 associated with the customer 214 might be able to access data stored to the secured resources 212 under the user account, where the application 224 obtains delegated access using the user credentials 208. While neither the customer 214 nor the application have rights to access those resources 212, the ability to present the credentials can enable the customer and/or application to obtain at least some level of access under the user account. For example, the application might be able to pull data from the user's secured resources 212, perform operations on behalf of the user using the resources 212, etc. An identifier or other information submitted with the request can enable the provider environment to determine the appropriate delegation profile, and the customer or application can obtain the amount and/or type of access granted under the delegation policy. The amount and/or type of access can be configurable, as may be determined by any of the end user, the provider, or the customer, among other such entities. In at least some embodiments, the user can specify a different delegation profile for each application, customer, provider, etc. In each case, the delegation profile might have to specify a subset of the access allowed to the end user under the user account with the provider.

In this example, the end user 202 has another application 226 installed on a client device. While applications are used for purposes of explanation, it should be understood that the end user can access resources using Web pages, Web services, or other such approaches as well within the scope of the various embodiments. In this example, the application 226 is provided by, or otherwise associated with, a third party developer 218. The application 226 is able to access resources across the at least one network 228, but in this example the resources are provided through a different resource provider environment 220 associated with a different resource provider. In this example, neither the end user 202 nor the customer 214 have an account with the second provider environment 220, nor are they able to directly access any shared resources 222 associated with the third party 218 under an account of the third party with the second provider. The resource provider environment 220, however, can accept credentials offered by the identity service 204 to enable parties such as the end user 202 to obtain access under the account of the third party 218, at least to the extent allowed by a delegation profile or other type of delegated access. As with the secured resources 216 of the customer, the secured resources 222 of the third party can be accessed by the application 226 on the end user's device, even though the end user does not have a relationship with the second provider environment 220. Information from the request, such as an application identifier or delegation profile identifier, can be used to determine the amount and/or type of access to grant the application 226 under the third party account.

In at least some embodiments, the application 224 associated with the customer 214 can also obtain at least some level of access to the secured resources of the third party 218, even though the customer has no relationship with either the third party 218 or the second provider environment 220. For example, the customer application 224 might manipulate and/or store image data for the end user 202 in the secured resources 212, 216 of the customer and/or end user in the first provider environment 210. The second application 226 might be a photo printing application or service, for example, that the user might want to use to print images stored in the first provider environment. The resources used for the photo printing service, however, might be the secured resources 222 of the third party 218 in the second provider environment 220, which is not affiliated with the customer or end user. In some embodiments, the end user 202 can obtain the images from the first provider environment 210 and can submit the images to the resources 222 in the second provider environment, along with the credentials 208, in order to obtain an amount of access or usage as allowed under the determined delegation profile. In some embodiments, however, the secured resources 222 of the second provider environment 220 might be able to access the end user data stored by at least some of the secured resources 212, 216 in the first provider environment by providing a copy of the end user credentials 208 with the request. Similarly, the application 224 associated with the customer 214 might be able to submit images from the first provider environment 210 to be processed by the secured resources 222 in the second provider environment, by submitting a copy of the credentials with the request or call for the processing.

In each instance, this "cross-account" access can be obtained by providing a copy of the credentials 208 provided by the identity service, with at least some additional identifying information in at least some embodiments. In some embodiments, the credentials provided by an identity service may be used to prove identity without also providing a copy of the credentials. As an example, a signing credential might be provided, with a signature being presented instead of a signing credential, etc. In embodiments where identifying information is provided, the identifying information can include any information useful in determining a type of access to allow, such as may include an application identifier, a specified access identifier, an account identifier, and the like. In some embodiments, the credentials might be mapped to an identifier for a user, application or device, for example, that then can be used to determine the appropriate delegation profile. Various other types of information can be provided as well within the scope of the various embodiments.

In the example of FIG. 2, it is possible that requests from an end user 202 could obtain access to the secured resources 222 associated with the third party 218 under at least five different types, amounts, or levels of access dictated by at least five different delegation profiles. For example, the end user 202 might obtain a first type of access when accessing the secured resources 222 of the third party 218 using the third party application 226 and the user credentials 208. The user also might be able to obtain access, which might be more restrictive, by submitting requests directly from the end user 202 or through the application 224 associated with the customer. In each of these cases the end user can obtain some level of access to the secured resources 222, where an appropriate delegation profile for each is determined based at least in part upon the source of the request, as may be specified by information included with the request. Similarly, requests for access to the secured resources 222 can be made by the secured resources 212 associated with the end user 202 or the secured resources associated with the customer 214 in the first provider environment 210. Those resources can submit requests with a copy of the credentials and any other information needed to determine the type of access to be provided. In some cases, the customer 214 might also be able to obtain some level of access to the secured resources 222 of the third party based on the relationship of the customer 214 with the end user 202.

In each of these cases, there can be multiple parties specifying a level of access to be provided to any or all of these resources. For example, the second provider or third party 218 can be able to determine a maximum amount of access to the secured resources 222 of the third party 218 that can be obtained by any particular entity, such as the end user 202 or customer 214, or any applications, services, or other resources, among other such options. In addition, any of those entities can further limit the type of access to be provided. For example, the third party 218 might grant read and write access to data stored by the secured resources 222 under a delegation profile for the end user 202. The end user might not want to be responsible for writing over data stored on those resources 222, or otherwise manipulating the data, such that the end user might specify (as part of the request, a delegation profile, or otherwise) that the access is to be read-only. Similarly, the customer 214 might specify a type of access that the end user 202 can obtain through the customer application 224, where that customer might potentially be liable for at least part of the access.

In addition, any or all of this access must be paid for by at least one party, such as a provider of the resources, a customer of the resources, an end user, a provider of an application or service, etc. Accordingly, each party might also specify rules or policies limiting an amount of access or incurred cost, or shifting the burden of the cost after an amount of access, among other such options. For example, an end user 202 downloading and installing an application 226 from the third party 218 might get up to $1.00 worth of access to the secured resources, or some other amount such as a number of requests, a time of processing, etc. After that point, the end user might have to set up an account with the provider, shift operation to the resources 212 of the end user, or make another such adjustment. If the access is coming from the application 224 or resources 216 of the customer, then all of the cost might have to be accepted by the customer or the end user. Various other cost structures can be implemented as well, depending at least in part upon the path or source of the access request. In some embodiments, a limit might be placed on the amount of access by a source of the request. For example, if the customer 214 is responsible for access to the third party resources 222 as triggered by the customer application 224, the customer might limit the amount of access the end user 202 or customer application 224 can obtain where the customer is liable.

Approaches in accordance with various embodiments thus can provide and/or utilize mechanisms by which transitive trust from a first party (such as an end user, developer, or other such entity) can be established through a third party to a customer and/or a resource provider. In one example, an end user might log into a social networking site that provides identity management. The end user can be assigned an identifier, or other credential as discussed herein, that is used to identify that user to entities associated with the social networking site, or that have at least agreed to accept such identifiers or credentials as authenticating information. An application developer might provide an application that can be downloaded and executed by end users who have accounts with the social networking site. As discussed, the application might utilize resources that are associated with the developer but offered as part of a service provider system or environment. In order to enable the end users to obtain access to those resources, but manage the amount or type of access that can be obtained, the developer can create one or more policies that enable third-party authenticated end users to access at least a portion of those resources, such as by uploading data to a storage instance path that starts with, or includes, the identifier for the user. Such an approach ensures that customers do not interfere with each other's data, as there can be a naming prefix based at least in part upon each end user identity. A given resource thus can be logically separated into regions or portions that correspond to particular user identifiers, and the regions or portions can be restricted from access by other users or portions, etc.

Further, the developer might want to restrict the actions that can be taken by those end users, or entities associated with those end users, with respect to a particular resource, or set of resources. For example, the developer might enable entities to upload and view high scores for a gaming application, but might not want to allow any entities that obtained access via the third party identity service credentials to launch or delete instances of specific resources. The developer thus can limit access to various tasks or subsets of resources within a service, for example, where the specific tasks or subsets can depend at least in part upon the identity of the user associated with the credentials, as well as the source of authentication for that user, among other such information discussed herein. A customer can perform any task allowed by the provider of the resource under the customer account, and the customer can determine which types or subsets of those tasks to delegate to an end user or associated entity. In some embodiments, the delegations might correspond to individual user identities such that an entity might be allowed to access a portion of a set of resources in a storage service associated with a specified user identity, or a namespace associated with that user identity. Such an approach enables a customer to delegate additional permissions, but only against portions of the resources having context associated with the third party identifier. The context also might include information in addition to the user identity. For example, an identity provider might provide a physical address for a user, where the geographic location might be a determining factor in the type of access granted.

In some embodiments a customer might want to allow entities to access the customer's allocated resources, but might not want to be responsible for an unlimited amount of usage. A customer might then specify one or more quotas on the amount of usage by some or all entities and/or end users. For example, a customer might specify that each end user verified by a particular identity service can consume up to $0.35 of resources, and/or the total amount of consumption by users verified by that identity service can be capped at a dollar amount, number of requests, volume of usage, or other such metric. Similarly, entities associated with that user might count against the same budget amount, or a separate collective amount, among other such options.

Figure 3:
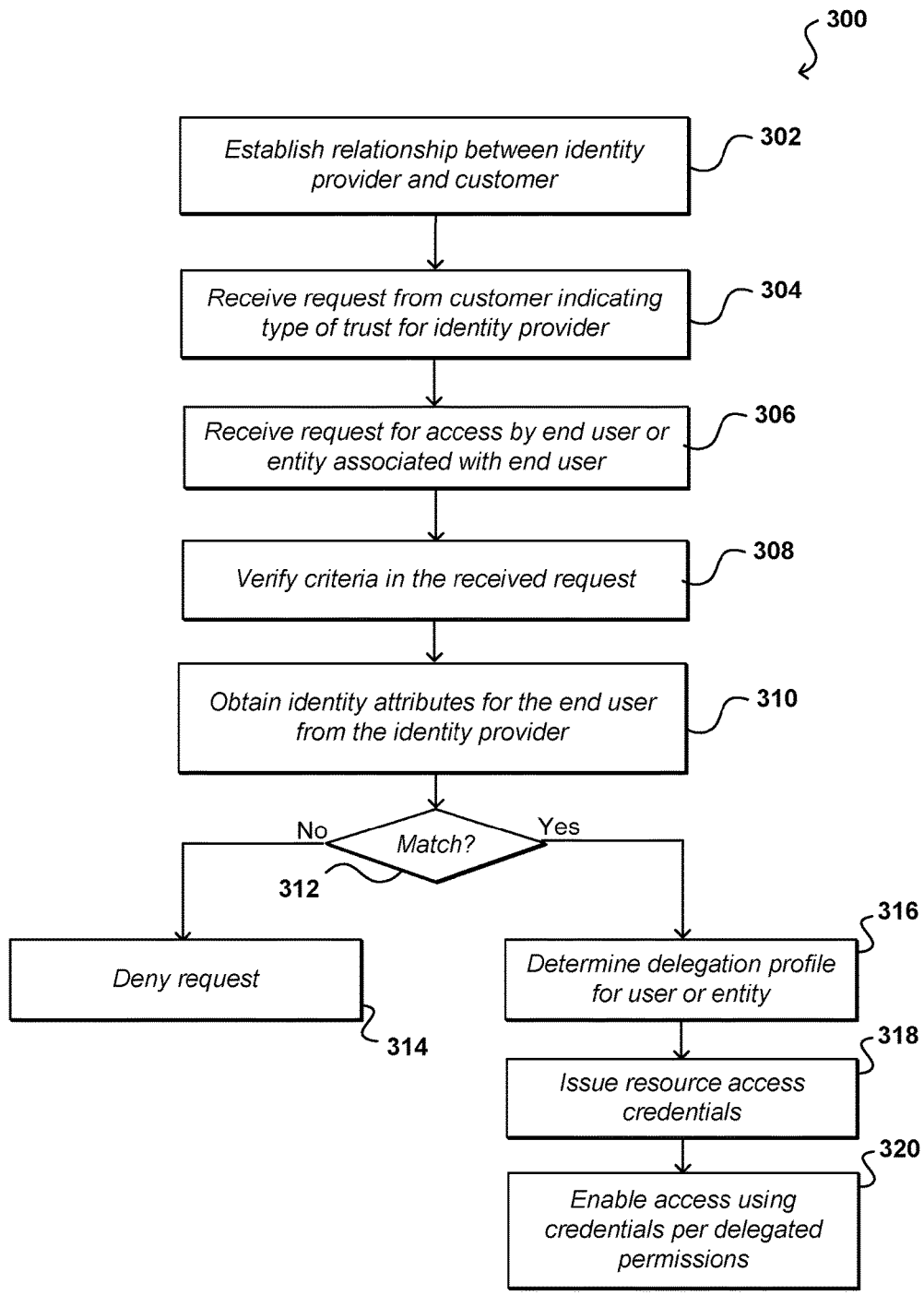
FIG. 3 illustrates an example process for determining a delegation profile to apply to enable access to resources in accordance with various embodiments.

FIG. 3 illustrates an example process 300 that can be used to enable a customer of a resource provider to delegate access to one or more resources in accordance with various embodiments. It should be understood that, for any process discussed herein, there can be additional, fewer, or alternative steps, performed in similar or different orders, or in parallel, within the scope of the various embodiments unless otherwise stated. In this example, a relationship can be established 302 between an identity provider and a customer of a multi-tenant environment, or in some cases between the identity provider and the resource provider. There will also be a relationship established between the identity provider and a group of end users. A request can be received 304 from the customer to indicate that the identity provider is trusted to assert certain things about end users to resources allocated to the customer in the multi-tenant environment, as may include identity and location information, as well as information about the type of user or other such aspects. In embodiments where entities associated with an end user, the request (or a separate request) can also specify that the assertions about an end user can be used to provide access to entities associated with an end user. The customer in some embodiments can establish rules to define the set of federation providers to be trusted for the customer account, whereby a provider must comply with the rules to be trusted by the multi-tenant environment. An example of a rule could be that the provider complies with a determined information format, has a minimum number of customers, and supports a specified type of identity verification. Such an approach provides for a criteria-based vetting of identity providers, instead of requiring the providers to be specifically indicated by name or other identifier.

Once the access is enabled, a request can be received 306 from an end user, or entity associated with the end user, for access to at least a portion of the customer's resources in the multi-tenant environment. As discussed, this request can come from the end user, an application of the end user associated with a third party, or a service accessed by the end user, among other such options. The multi-tenant environment can verify 308 criteria in the received request and use the criteria to obtain 310 identity attributes for the end user from the identity provider. The obtaining can be performed by, for example, requesting the information from the identity provider or examining a cryptographic token included with the request, among other such options. The attributes can be used to verify that the user identity information is correct and signed by the identity provider. A determination can be made 312 as to whether the information matches. If not, the request can be denied 314. If the information matches or the user is otherwise authenticated, one or more delegation profiles 316 can be determined based at least in part upon the information for the user, the customer account for the resources to be used in providing access, information identifying an application or entity associated with the end user and generating the request, and other such information. One or more access credentials then can be issued 318 to the end user, external entity, or other source of the request, where those credentials are scoped by the determined delegation policy or other permissions that were previously expressed by the customer to apply to the type of request. The issuance of the access credentials enables 320 direct access to at least some resources allocated to the customer, as determined by the determined delegation policy. As determined, the amount and/or type of access can vary for different entities using the same user credentials, and the type of entity can determine which delegation profile and/or type of access is to be granted.

In some embodiments, one or more rules can be evaluated to determine a set of policies indicating whether to apply a delegation profile, as well as the proper delegation profile to apply. The rules can take the form of code that is evaluated in the context of the permissions to determine the appropriate policy, could involve simple declarative rules with support for conditional statements, or could utilize variable substitution, among other such options. There can be different rules for different types of entities, as well as paths through which requests for access take. As discussed, an end user might be able to obtain a first level of access when submitting a request directly to a set of resources, but might only be able to obtain a second, lower level of access when submitting a request to those resources through a third party application, even though the same user credentials may accompany each request.

In some embodiments, a set of templates can be used to allow mapping between the incoming identity, information about the source of the request, and the outgoing permissions. An example template can allow access to a specified link (e.g., a URL for a storage resource), where that link might include an identifier or variable that corresponds to the user or associated entity. Such an approach can provide directory-like semantics, where a user data directory can be provided on top of a user-specific subfolder for each user who has used that directory. This can be expressed in a single document that gets the replacement of the variable whenever a user attempts to obtain access.

Instead of (or in addition to) templates, another approach can be based at least in part upon a set of rules such as those discussed above. Other approaches to performing the mapping can be used as well, where the set of information provided by the third party identity service is accepted as input, potentially filtered by what the customer decides to trust. In some cases there might be certain identity information that is mandatory. There might also be information about the customer obtained from the resource provider environment, particularly when the appropriate customer was auto-detected. The information might also include additional metadata as set by the customer, among other such options.

The various information and attributes from the various sources can, in at least some embodiments, be passed through a rules engine that can output a document with one or more policies dictating what the user and/or an associated entity is allowed to do against the resources allocated to the respective customer. The rules engine might also be operable to manipulate other resources in the course of making that determination, such as reading or writing information to a data store for purposes such as quota maintenance or mapping updates, etc. In some embodiments a new identifier can be associated with an entity that has not previously been encountered, and the identifier can be an additional output of an example mapping process. The output thus can include at least a credential that allows the end user and/or associated entity to access at least a portion of the customer allocated resources, the permissions that define what the end user can do with that access, and optionally some metadata that goes back to the customer or is stored by the resources.

At least some embodiments might also utilize a generic output step as a way of facilitating quota maintenance. This might include a second set of rules that are run after the credentials and permissions are determined and provided for a particular end user. These can cause quota data to be stored or updated, or other such information to be written, and in some embodiments might even cause additional instances to be provisioned. There can be different quota for users than for related entities, and a quota for a related entity might be based at least in part upon all end users associated with that related entity.

As mentioned, in some cases an end user might be associated with several customers, such as where the end user has downloaded apps from multiple developers onto a single computing device. Thus, when a request for access is received from an end user that contains identifying information from a third party identity service, it can be necessary to determine the appropriate customer account to which to provide access for the specific request. For example, it can be necessary to determine which application is associated with the request, and which customer is associated with that application, in order to determine which permissions to provide so the application can only access resources for the respective customer. In other embodiments, it can be necessary to determine which customer is associated with the resources that the user (or entity) is attempting to access.

As mentioned previously, requests can in some embodiments include an identification of the appropriate delegation profile to use. When the delegation profile is not identified, the system must determine the appropriate profile to use based on other information in, or associated with, the request. In an embodiment, an authentication mechanism such as PKI (Public Key Infrastructure) or SAML (security assertion markup language) might be used to assert claims with respect to the identity of an end user and/or associated entity. The certificate used to sign the request for one of these mechanisms can be associated with a particular delegation profile, and thus used as an indication of the appropriate delegation profile. After the information provided with the request is verified, various rules can be used to determine the appropriate account and security principle within that account to be assigned, while in other embodiments the account and principal can be claimed as part of the request. Various other such approaches can be used as well. The appropriate principal can be previously designated by the customer, such that any end user or entity who comes in with a claim signed by the appropriate public certificate, provided by the customer, has a specified profile applied. In some embodiments, the requests might include an identifier for the desired profile, and the users can obtain access per that profile when the mapping indicates that the profile is mapped to that end user. In some embodiments, a single profile might be able to be associated with a particular public certificate, such that the end user is limited to the profile associated with the certificate.

In some embodiments, a request might be received that is not associated with a third party identity service, but with an identity service associated with the resource provider environment. If the system can unambiguously determine that the respective end user is associated with the resource provider environment, the appropriate delegation profile can automatically be attached to the request. Certain customers might want such a request to be able to obtain a full delegation of rights, subject to any applied restrictions.

In another example embodiment, a wildcard domain name service (DNS) could be operated for a token acceptance endpoint in accordance with various federation protocols.

Such an approach can enable a customer to use a unique end point to receive the token, enabling most protocols to be disambiguated. Many federation protocols include an indication of where the credential is being delivered, so if a multi-tenant federation gateway is included that can provide a of DNS endpoints, the system can provide full disambiguation.

In at least some embodiments, there can be different roles assigned to entities associated with the same user identifier or credentials, where each of those roles can be associated with a different delegation profile. For example, a user providing identity information to an identity service can receive a credential such as an authentication token. If that user then submits a request with that credential to a set of resources associated with a customer, the user can obtain an assumed role that enables the user to obtain a first level of access associated with that role under the appropriate delegation policy. If the user utilizes an application associated with a third party that makes a similar request to those resources using that credential, a different role can be assumed wherein access can be granted but a second, limited type of access granted based on the role being that of a party or entity acting on behalf of the user. If the third party has a relationship with the provider, a third role might be assumed wherein a level of access might be granted that can in some cases exceed that of the user without the third party relationship. Various other roles can be utilized as well. In at least some embodiments, the roles will be assigned or determined using the respective credential and information regarding a source of the request, a type of entity, a delegation profile to be used, or other such information. In at least some embodiments, the same user credential issued by an identity service can be used by multiple entities in a distributed, multiple provider environment, for example, wherein different roles and levels of access can be assigned for the same credential based at least in part upon the type of entity presenting the credential and/or a relationship of that entity to the respective provider. Further, such an approach can enable different levels of access across accounts of multiple customers of the same, or different, providers.

In some embodiments, at least one interface might be provided that enables a party such as an end user or customer to control aspects of resource access associated with those parties. For example, an end user might be able to specify or limit the amount and/or type of access that a third party can take on behalf of that user. Similarly, the third party can limit the actions that can be performed on behalf of a user, and a customer or provider can use such an interface to control the type of access that can be performed by any or all of these parties. This control can include, for example, specifying one or more roles, or one or more delegation profiles, for each of these parties (or types of parties).

In addition, each party can also specify information about payment for use of the respective resources. For example, a customer who provides applications for use by end users might allow each end user to obtain a certain type of access, or a certain amount of access, to resources associated with the customer. This can include, for example, up to an amount of data storage capacity or processing capacity, or up to a maximum cost of resource usage. The customer can also specify how to handle any requests that exceed those limits. For example, the customer could indicate that the user is responsible for paying for any access beyond the limit, or might not enable the user to obtain any access to the customer resources when the user has reached the limit. Similar rules or policies could provide for other entities as well. For example, a third party presenting credentials for an associated end user might have a different cost structure specified, wherein the end user or third party might be responsible for some or all of the cost of the access.

As discussed, however, not every entity associated with an end user may be associated with a customer or a provider of customer resources. Such an entity thus will be unlikely to have an account against which such access can be charged. Approaches in accordance with various embodiments can utilize any of a number of different approaches to attempt to obtain compensation from an entity for an amount of access granted on behalf of an end user or other party delegated access to resources under a customer account.

In a first embodiment, each party determined to be responsible for at least a portion of the cost of access to a set of resources under a customer account might be required to provide an appropriate amount of digital currency with a request. For example, a delegation policy might allow access to resources only where a request for access includes a source of funding, such as a digital cash payment, in addition to valid user credentials and other information discussed herein. Such a request then can be processed and/or have resources allocated without requiring a source of the request to first set up an account with the customer and/or provider. Various types of digital cash, electronic money, or crypto-currency can be used, such as Bitcoins provided by the Bitcoin P2P Currency System.

A resource manager or other such component receiving such a request can verify the amount and authenticity of the digital cash, and if the amount is sufficient (and any other necessary criteria are met), the resource manager can provide access to the requested resource(s). In at least some embodiments the resource manager can store information, such as an expiration time or capacity limit, in an appropriate accounting data store or other such location. As long as an expiration criterion has not been reached, the source of the request (and potentially other users or entities associated with the user credentials) can utilize the allocated resource(s). Such an approach enables access to various multi-tenant resources without requiring those resources to be tied to a particular account with the respective customer and/or provider.

Systems and methods in accordance with various embodiments can enable a user or entity to obtain and/or extend access to one or more resources by providing a source of funding with each corresponding request. For example, a customer offering a Web service used by many users and third parties may no longer wish to be responsible for payment for the maintenance of the service for some or all of these entities. The customer in such an example can enable additional requests with payment to be processed, however, such that the customer is not responsible for excessive access by certain entities, such as access beyond an amount provided through the relationship of those entities with the customer.

Figure 4:
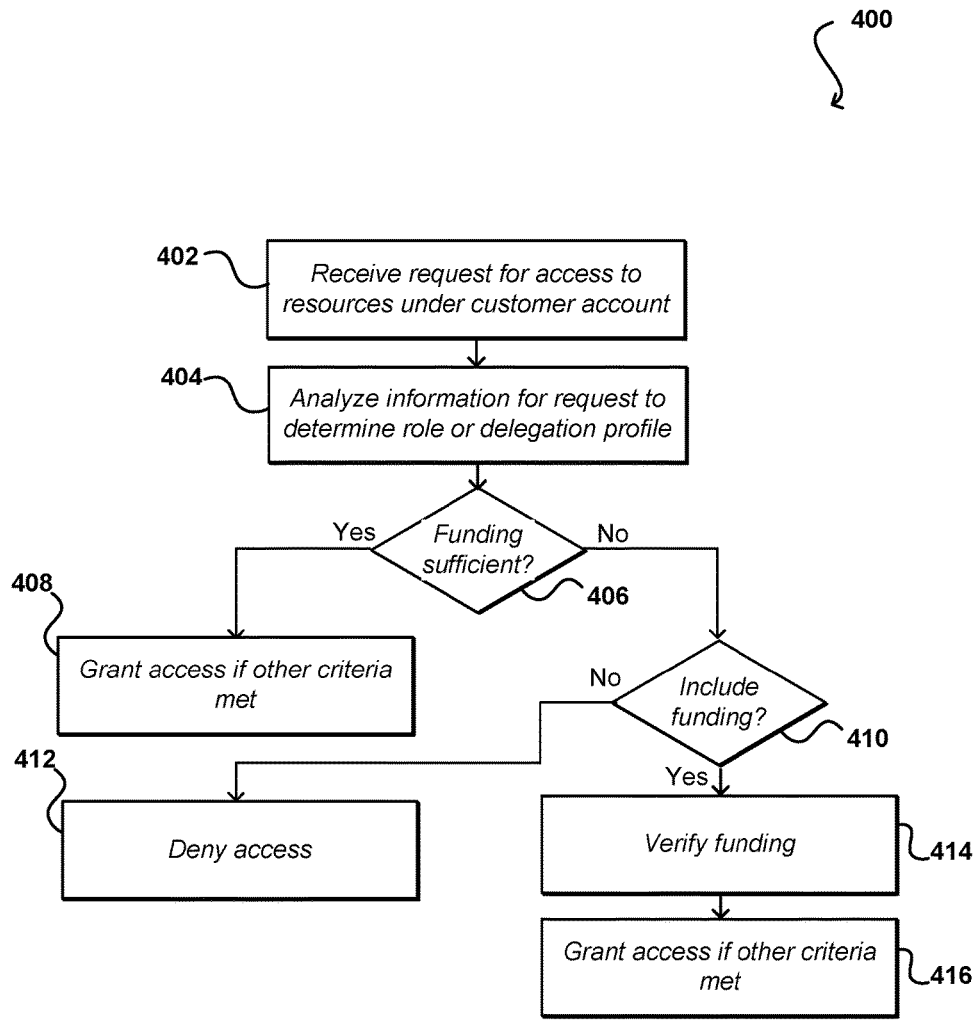
FIG. 4 illustrates an example process for ensuring funding for delegated access to resources in accordance with various embodiments.

FIG. 4 illustrates an example process 400 for funding access to resources across different accounts in a distributed resource environment that can be utilized in accordance with various embodiments. In this example, a request is received 402 from an entity to obtain access to one or more resources under a customer account. The request can include at least one user credential associated with a user and issued by an identity service having a relationship with the customer and/or a provider of the resource(s) as discussed herein. Information for the request, such as the credential and other relevant information, can be analyzed 404 to attempt to determine at least one of a role or a delegation profile associated with the request. A determination can be made 406, based at least in part upon the role or delegation profile, as well as prior use data or other information, as to whether the access should be granted without additional funding. If so, the access can be granted 408 in response to the request. If additional funding is required, a determination can be made 410 as to whether funding is provided and/or specified by the request. If not, the request for access can be denied 412. If a source of funding is included and/or specified by the request, the funding can be verified 414, such as by determining an amount of digital cash provided or verifying an account number, where that account can be with an entity other than the resource provider (e.g., a financial institution). At a time after the funding is validated, the access to the resources can be provided 416, assuming other criteria for the access are met as well.

It may also be the case, however, that other entities might want to provide funding to keep certain resources accessible. For example, a third party application developer might want their applications to be able to continue accessing those resources, even when the resources are not associated with the third party developer. In such an instance, the third party developer can provide sources of funding for the requests, or can cause each such request to include a source of funding to cover the cost of the access. Additional access can be funded by donations from other users or entities as well, such as to support the continued storing of data, providing of an application environment, and the like. In such an embodiment, an entity can provide a donation for a specific task supported by a group of resources, or can potentially provide a donation for a specific resource or resource instance, among other such options. In some cases, such an approach can allow access to continue even if an original entity or customer associated with the resources no longer provides payment or has an account with a provider of those resources.

In some embodiments, one or more types of advertising might be used to provide payment for access to one or more resources. For example, an end user might have to agree to view advertising during a login process with the identity service, or might have to agree to view advertising in an application or service that accesses resources under a customer account, where the user is able to access the resources as long as the advertising criteria is met. In at least some embodiments there can be an ongoing advertising obligation in order to continue to be able to access one or more resources associated with an account of a customer or other third party.

Figure 5:
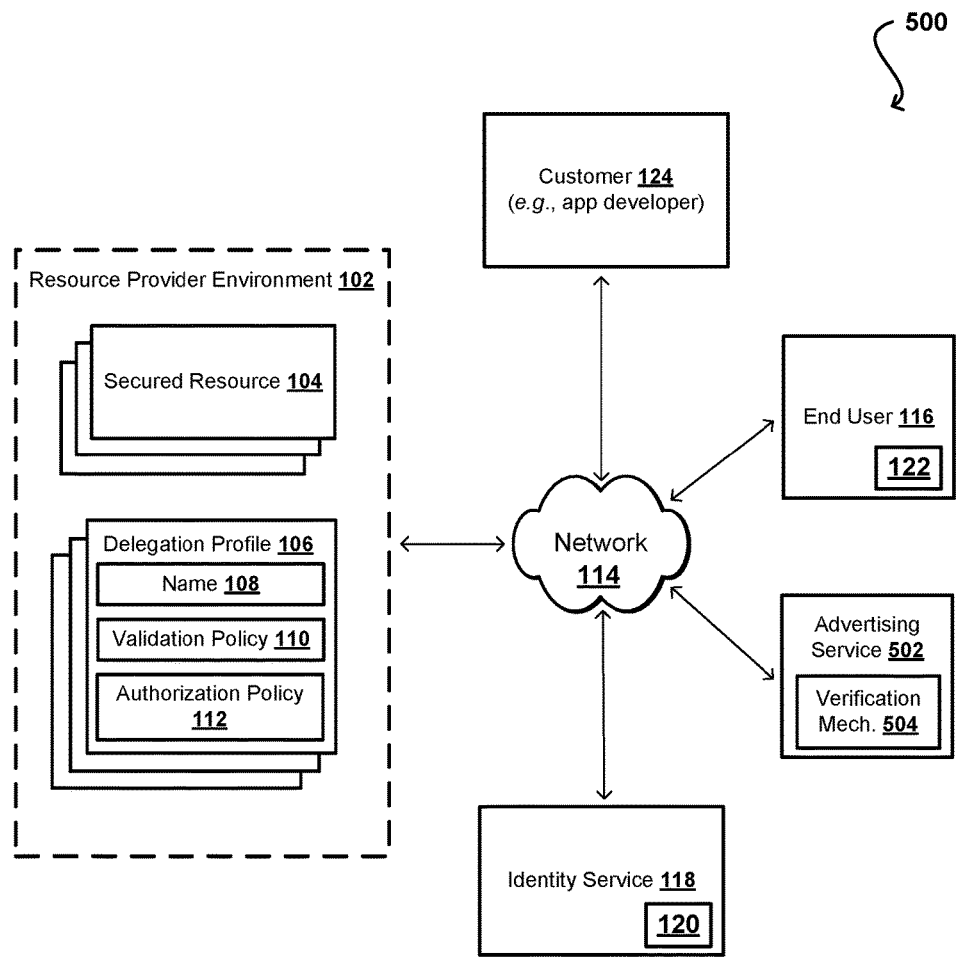
FIG. 5 illustrates another example environment in which aspects of the various embodiments can be implemented.

For example, FIG. 5 illustrates an environment 500 similar to that of FIG. 1, but with the addition of an advertising service 502. It should be understood that reference numbers are carried over between figures for similar components for purposes of explanation, but that such use should not be interpreted as a limitation on the various embodiments. Further, it should be understood that the usage of an advertising service or entity can be used with multiple parties, providers, and/or accounts as well, such as is discussed with respect to FIG. 2.

In this example, a provider of the resource provider environment 102 or the customer 124 having an account with the provider for the secured resources 104 can establish a relationship with an advertising entity or service 502, which can be part of, or separate from, either the customer or the provider environment in at least some embodiments. As discussed with respect to FIG. 1, an end user 116 can obtain credentials from an identity service 118 that enable the end user 116 to access at least a portion of the secured resources 104 associated with the account of the customer 124. In this example, at least some of the access by the end user 116 is not funded by the customer 124. The user then can obtain access by agreeing to view advertising from the advertising service 502, when then will provide funding to the customer and/or the resource provider. The advertising can be displayed at any appropriate time, such as at login, while accessing an application, while viewing a page, before submitting a request, before receiving a specified amount of access, or at any other appropriate time. As discussed, there can be an ongoing obligation in at least some circumstances, such that the user agrees to view or receive at least a specified amount of advertising in return for the ability to access the resources. In at least some embodiments, the amount of obligation can correspond to the amount of access obtained and/or the amount of access able to be obtained under a corresponding role or delegation profile, etc.

In order to ensure that the user is receiving the advertising and/or satisfying the obligation, at least one callback module or verification mechanism 504 can be used to monitor, track, or determine the amount of advertising received and/or displayed. The mechanism can work with software installed on a client device or embedded in script executed on a client device, for example, to determine an amount of advertising received and/or displayed to the user. In a situation where other entities associated with the user obtain access to those resources, different advertising obligations might be accepted and monitored to provide for that access. In some embodiments, a third party application developer might agree to display ads from the advertising service in the party's application(s) in order to obtain the access needed and/or utilized for those applications. In some embodiments, the advertising obligation accrues with continued access, or is set per period for level of access, among other such options.

Figure 6:
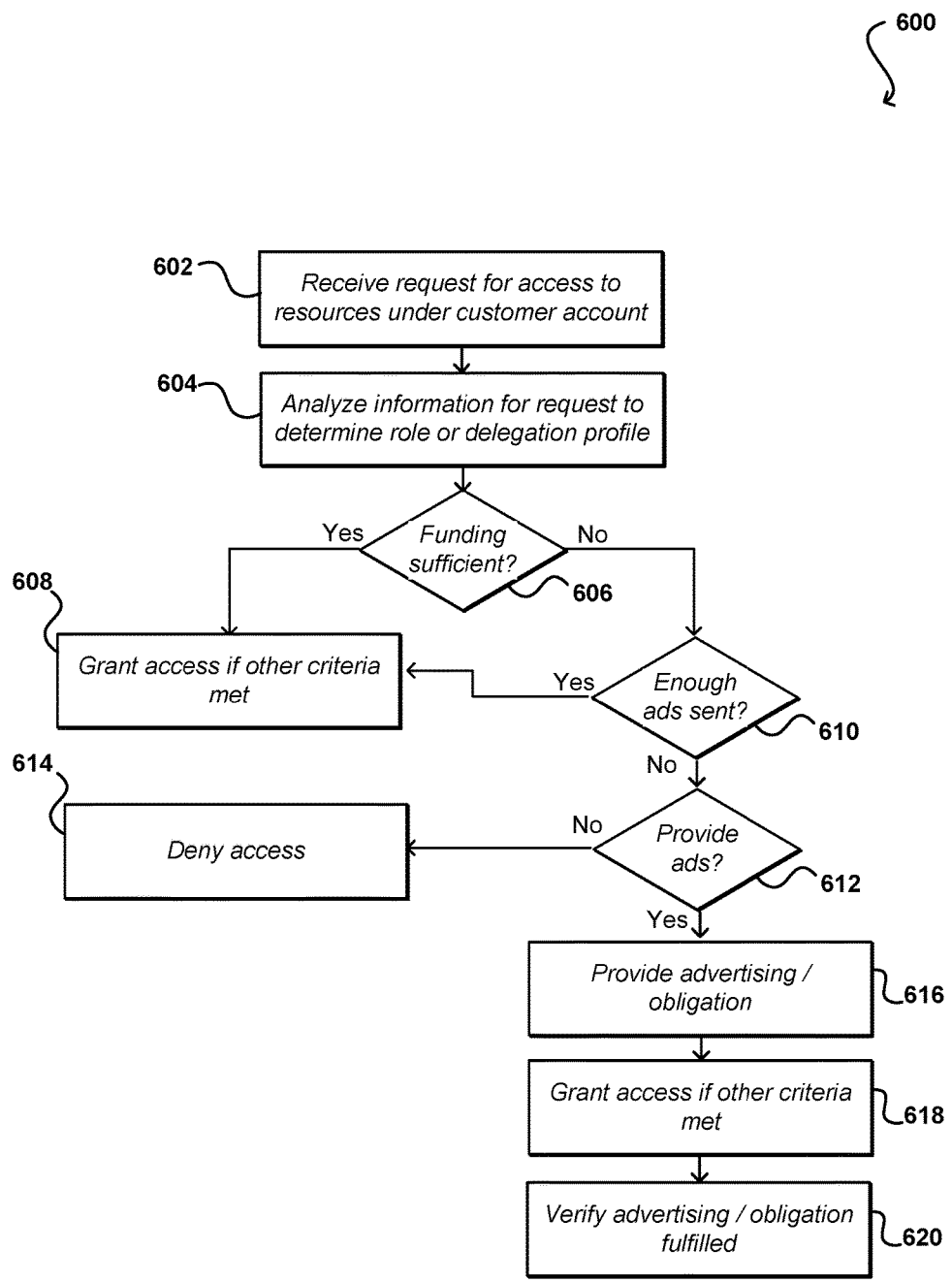
FIG. 6 illustrates another example process for ensuring funding for delegated access to resources in accordance with various embodiments.

FIG. 6 illustrates an example process 600 for supporting access to resources using advertising that can be utilized in accordance with various embodiments. In this example, a request is received 602 from an entity to obtain access to one or more resources under a customer account. The request can include at least one user credential associated with a user and issued by an identity service having a relationship with the customer and/or a provider of the resource(s) as discussed herein. Information for the request, such as the credential and other relevant information, can be analyzed 604 to attempt to determine at least one of a role or a delegation profile associated with the request. A determination can be made 606, based at least in part upon the role or delegation profile, as well as prior use data or other information, as to whether the access should be granted without additional funding. If so, the access can be granted 608 in response to the request. If additional funding is required, a determination can be made 610 as to whether sufficient advertising has been displayed to support the requested access. If so, the requested access can be provided. If not, a determination can be made 612 as to whether sufficient funding can be obtained through a display of advertising at the current time or an ongoing obligation. If not, the access can be denied 614. If so, the advertising and/or obligation can be provided 616, and the access granted 618, assuming other criteria for the access are met as well. If the obligation is ongoing, at least one verification can be performed 620 to ensure that the obligation is being fulfilled.

In some embodiments, the amount of advertising to be displayed can be reduce in response to a user or entity performing a specific action with respect to previously displayed advertising. For example, a user selecting an ad to view more information can cause less advertising to be displayed, where an advertiser provides some level of funding in response to the selection. Similarly, a user purchasing an item associated with provided advertising might have a further reduction in advertising, or even no more advertising provided at least for a period of time, where the party from which the item was purchased will provide some level of funding. Other variable advertising compensation models can be used as well, with other responsible parties as appropriate. In some embodiments, a user might have an option to provide funds in exchange for not receiving further advertising. In some embodiments, a user might be able to obtain access for free (or a relatively low price) in exchange for viewing an amount of advertising, and might pay a higher price to obtain access without advertising. Other pricing models can be utilized as well within the scope of the various embodiments.

As discussed above, the interfaces, roles, and/or delegation profiles can be used to determine who is responsible for funding resource access in different situations, as well as how that funding is to be provided. In some instances, a customer or provider might designate a particular advertising entity or service, while in other instances the source might not matter as long as the revenue can be verified and/or obtained. Funding approaches also can be combined, such as where an entity can provide digital cash if sufficient advertising has not been displayed for the amount of access being requested. Further, advertising from multiple related parties might be able to be aggregated to support certain types of access. Various other such approaches can be used as well within the scope of the various embodiments.

As discussed, many embodiments can enable an account owner to establish one or more delegation provides, where each delegation profile can be associated with an account for a customer of a service provider environment or system. The service provider can provide network-accessible services (e.g., Web Services), and in at least some embodiments the account can be associated with a set of resources and principals that can use those resources. The account is secured such that access to the resources of the account is controlled and restricted to authenticated principals associated with, or including, the customer. The delegation profile thus encapsulates the grant of permission to a particular entity or set of entities (e.g., end users) to perform actions on the resources of the account while operating under the credentials of the delegation profile. This grant may span across multiple accounts of the service provider. In addition, the delegation profile may be used in a single service provider or between multiple service providers. The delegation profile can be used to delegate permissions between a plurality of services that are components of a distributed system.

In accordance with an embodiment, a person authorized by a top level identity creates a delegation profile in the account and specifies a name for the profile, a validation policy (granting access to external services or identities), and a set of capabilities for the users (i.e., external services or identities) that will be using the profile. The person can also set forth one or more policies, rules, or other criteria for determining the type(s) of users or requests that should be associated with a particular delegation profile.

External entities or entity types named in the validation policy can use a determined delegation profile to allow those entities to act as authorized users of the customer account, subject to the restrictions of the delegation profile. The delegation profile in some embodiments can be treated as a resource that is passed to calls that create entities and authorization of the caller is performed by the external service.

In situations where the appropriate customer cannot be determined directly from the request, contextual information from the customer and/or the identity service can be used to determine the customer resources, policies, and profiles to be used for the end user request. This information can include, for example, the application the user signed into, information in the navigational link, a certificate used to sign the request, or other such information.

In one example, an administrator of a customer's account may create a delegation profile named "profile1" with a validation policy that grants access to an automatic scaling service (i.e., security principal) to assume the delegation profile. By way of example, the scaling service may be responsible for adding or removing resources to the customer's account depending on demand for compute or storage capacity. When the customer of a service provider needs more computing resources due to an increase in traffic or workload, the automatic scaling service may automatically add compute instances to meet the traffic demand. Similarly, when some of the customer's leased resources are sitting idle and unused, the scaling service can automatically reduce the number of compute instances allocated to the customer.

The delegation profile can further include an authorization policy that specifies a set of permissions for the scaling service to perform. In this particular example, the specific action that is permitted is to "run compute instances" under the delegation profile in the customer's account. However, in alternative embodiments, the action can be any action that can be performed in connection with the account, such as accessing data, modifying resources, executing services and the like.

Once the delegation profile has been created, the administrator may grant the use of the profile to user of the account named "Bob" such as by including a statement "profile: useprofile" under Bob's identity in the account. After the user Bob has been granted the right to use the profile, Bob may invoke a scaling service to create a scaling group "Group1" (or any other resource modeled within the scaling service), passing in the unique identifier of "profile1" as an argument to the scaling service. For example, the scaling group "Group1" may be a resource modeled within the scaling service that is associated with a group of specific computing instances that should be managed (i.e., expanded or shrunk in number) by the scaling service. Another example of a resource modeled within a service may be code running on a computing instance that may need to invoke a resource in the account acting under the guise of the delegation profile.

Upon receiving the request from the user, the scaling service could check whether user Bob has permissions to perform the action "profile:useprofile" on "profile1" and create the appropriate group for the user. Subsequently, when the scaling group needs to take actions on the account, the scaling service may create a credential for the scaling group by passing a reference to "profile1" to an identity management service. The identity management service can be any security entity that can verify the validation policy and authorization policy of the delegation profile. In accordance with an embodiment, the scaling service would then use the resulting credential to represent the scaling group. All subsequent actions taken on the customer's account can be performed by the scaling group "Group1" which is an entity within the customer's account. In some cases, the customer's group may need to have permissions to take all actions within the account that are necessary, like launching compute instances.

A delegation profile can be created in an account of a service provider, for example, by an account administrator that manages a customer's account on a service provider. The delegation profile can specify a name, a security principal that will be allowed to assume the delegation profile, and a set of actions that the security principal will be allowed to perform in the account. An authorized user under the account is granted permission to use the delegation profile. For example, the administrator can enable one or more users of the account to provide the delegation profile to external entities so that they are able to access the account resources. The authorized user may provide a reference to the delegation profile to an external service. The external service may reside on the service provider but outside of the account in which the delegation profile was created. Alternatively, the external service may reside outside of the service provider itself. Once the external service receives the reference to the delegation profile, it can submit a request for credentials to perform actions in the account. For example, the external service may submit the request to a security token service and the request may indicate the delegation profile. The set of credentials can be issued to the external service if the external service was verified as having been designated a proper security principal in the validation policy of the delegation profile. These credentials can enable requests to be made within the context of an identity within the account, wherein the permissions granted to the service are based on the capabilities specified in the delegation profile.

A delegation profile can be provided to a service, such as by sending to the service a request including a reference to the delegation profile. The service receives the request to associate the delegation profile with a resource that is modeled within the service. For example, the resource may be any component or portion of the service that may need access to the account in which the delegation profile was created. The service can verify that the principal who provided the delegation profile has the permissions to specify (i.e., use) the delegation profile to the resource of the service. This can be performed by checking the permissions or other security information that are associated with the principal on the service itself. The resource of the service can obtain the credentials that will enable it to perform actions in the account in which the delegation profile was created. For example, the service may obtain the credentials on behalf of the resource modeled within it by invoking a security token service or an identity management service.

As discussed, in other embodiments an end user or other external entity might not be given a reference to a particular delegation profile, but the delegation profile might be determined dynamically in response to, for example, a request being received from a device associated with the end user, where the request requires access to at least one secured resource in a resource provider environment. Referring back to FIG. 1, a customer 124 might be a developer of an application that can be executed on a computing device associated with an end user 116. The customer 124 might have an account with the resource provider environment 102, whereby information can be stored and/or processed for the application, or users of the application, using one or more resources 104 in the environment. When a copy of the customer application is stored and executed on the computing device of a user 116, that application might send a request to the resource provider environment 102 in order to access one of the resources associated with the customer account, in order to obtain information or perform a task associated with the application. In some embodiments, this can include tasks such as adding a score to a leader board, processing data to obtain a result for presentation via the application, and the like.

It may be the case that the developer of the application, the customer 124 in this example, does not want to be responsible for configuring and managing an identity store for the various end users of the application. As discussed, in such situations the customer might want to utilize an identity service 118, federation service, or other such security service in order to manage the user identity information on the customer's behalf. The end user in such an example can provide identifying information, such as a username and password or other such information, to an identity service 118 with which the end user might have an account, profile, or other such relationship. In some embodiments, the identity service might be offered through the resource provider environment 102. The identity service can authenticate the user based at least in part upon the provided information, and then can vouch for the identity of the user. In some embodiments as discussed previously the identity service can provide credentials 122 (e.g., a secure token) to the user to be submitted with any request to the resource provider system 102 and/or customer 124, in order to prove the identity of the user associated with the request. In other embodiments, the identity service might receive requests for authentication information when a request for an end user is received to either the resource provider environment 102 or the customer 124, in which case the identity service will have to provide information indicating whether or not the request is actually associated with the user purported to be associated with the request based at least in part upon information associated with the request.

Since the application developer will generally be financially responsible for those resources 104 associated with the developer's account, the developer may want the ability to control, manage, or specify at least a portion of the tasks that the users can perform using resources associated with to the developer's account. This can be especially true when the developer might not have a directly relationship with many of the end users, where those relationships are established through the identity service or another such third party that is vouching for the identity of the end users. The resource provider environment thus can provide mechanisms that enable the developer and other customers to limit access and risk, rather than simply providing each end user with unlimited access to the resources associated with the developer.

Figure 7:
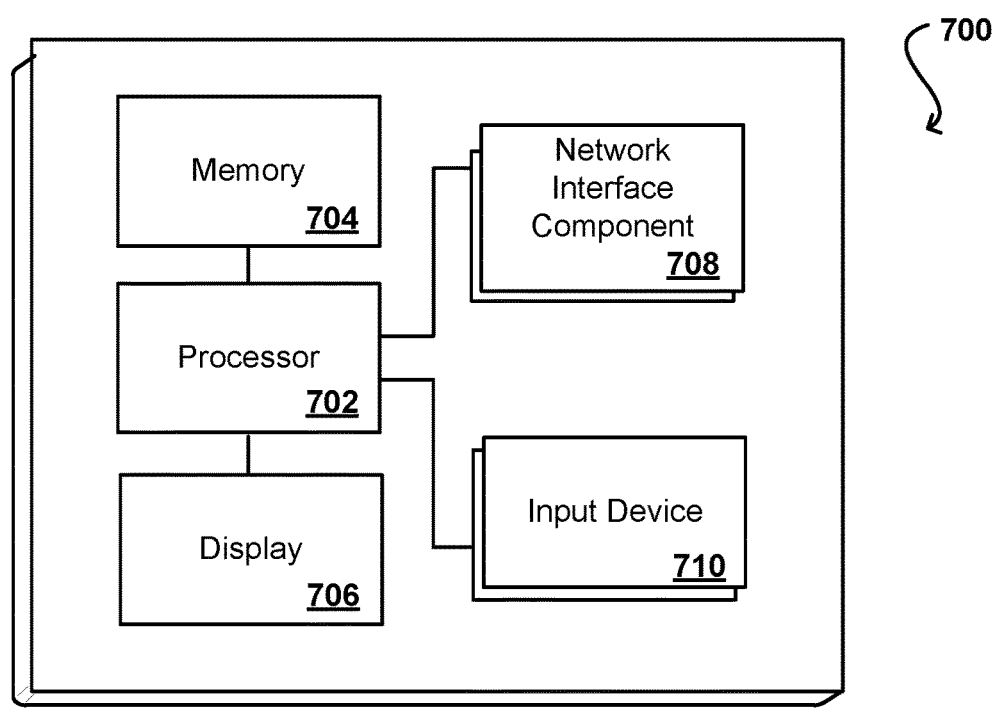
FIG. 7 illustrates a logical arrangement of a set of general components of an example computing device, in accordance with various embodiments.

FIG. 7 illustrates a logical arrangement of a set of general components of an example computing device 700. In this example, the device includes a processor 702 for executing instructions that can be stored in a memory device or element 704. As would be apparent to one of ordinary skill in the art, the device can include many types of memory, data storage, or non-transitory computer-readable storage media, such as a first data storage for program instructions for execution by the processor 702, a separate storage for images or data, a removable memory for sharing information with other devices, etc. The device typically will include some type of display element 706, such as a touch screen or liquid crystal display (LCD), although devices such as portable media players might convey information via other means, such as through audio speakers. The device can include one or more network interface components 708 configured to enable the device to transmit and receive information over a network. As discussed, the device in many embodiments will include at least one input element 710 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 700 of FIG. 7 can include one or more network interface elements 708 for communicating over various networks, such as a Wi-Fi, Bluetooth, RF, wired, or wireless communication systems. The device in many embodiments can communicate with a network, such as the Internet, and may be able to communicate with other such devices.

Figure 8:
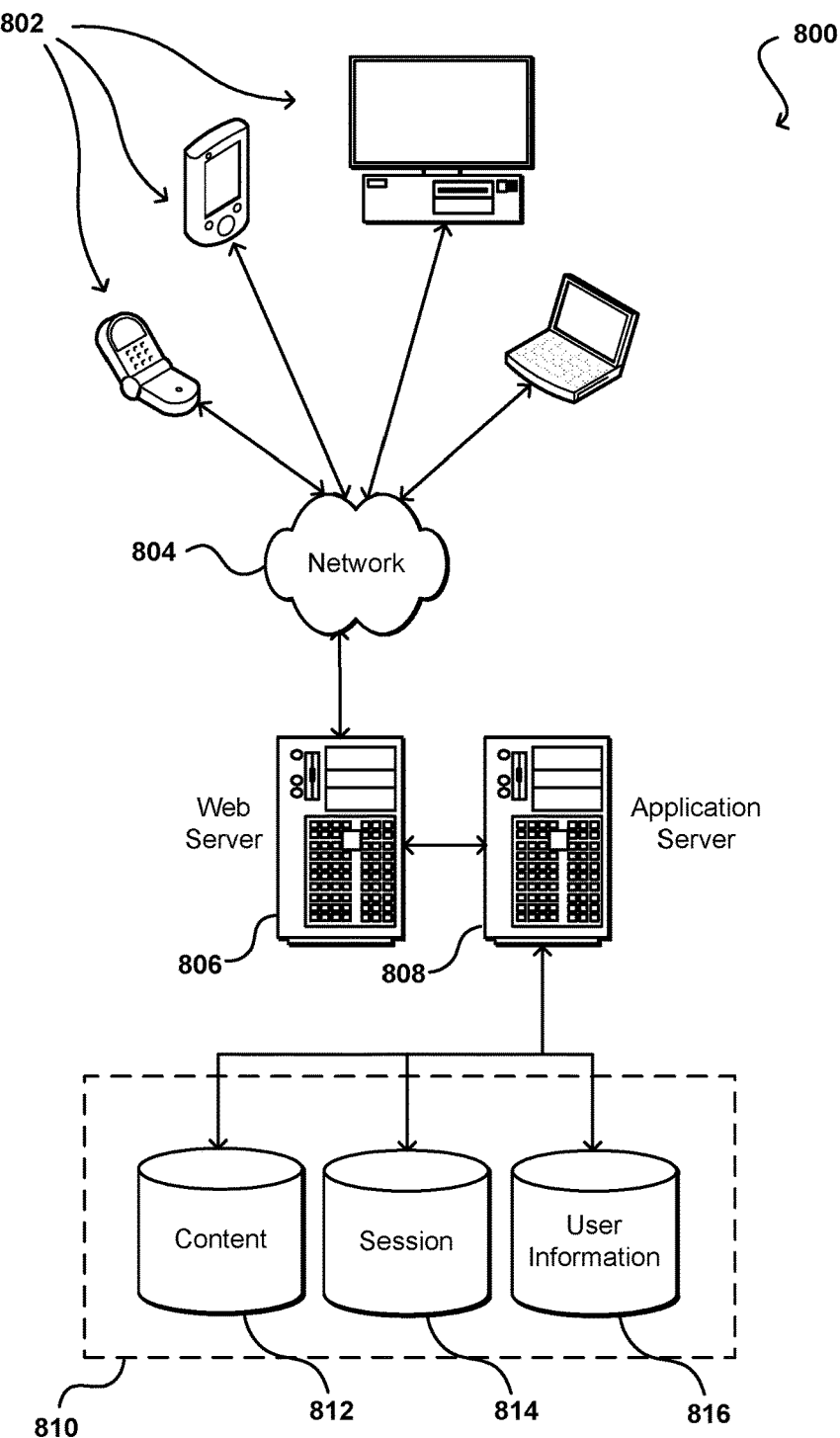
FIG. 8 illustrates an example of an environment for implementing aspects in accordance with various embodiments.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, JavaScript, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method comprising:
obtaining, on an application executing on a computing device, a user credential associated with a user;
providing, by the application to a first provider of web services, the user credential;
securing, in the application and from the first provider, access to a first web service and to associated web service credentials, the access based at least in part on the user credential, wherein:
the web service credentials are associated with the user credential; and
the web service credentials comprise access rights to first resources;
providing, from the application to a second provider of web services, the user credential and a copy of the web service credentials; and
securing, in the application and from the second provider, access to a second web service and to data corresponding to both the user and to the first web service, wherein the data is accessible on second resources controlled via the second web service.

2. The computer-implemented method of claim 1, wherein the user credential is obtained from a third party service.

3. The computer-implemented method of claim 1, wherein the user credential is obtained from a security token service or an identity management service.

4. The computer-implemented method of claim 1, wherein the first and second web services are web interfaces with configuration to access the first and second resources respectively.

5. The computer-implemented method of claim 1, wherein the first and second resources include viewing applications and storage applications.

6. The computer-implemented method of claim 1, wherein the access to the second web service comprises one or more of: permissions for administrators, users without delete capabilities, users without application launch capabilities, and users with limited access capabilities.

7. The computer-implemented method of claim 1, wherein the at least one of the web service credentials provided to the second provider is a web service credential with limited access permissions.

8. A system comprising:
at least one processor; and
memory including instructions that, when executed by the at least one processor, cause the system to:
obtain a user credential comprising identity for a user;
provide, to a first provider of web services, the user credential;
secure access to a first web service and to associated web service credentials, the access based at least in part on the user credential, wherein:
the web service credentials are associated with the user credential; and
the web service credentials comprise access rights to first resources;
provide, to a second provider of web services, the user credential and a copy of the web service credentials; and
secure access to a second web service and to data corresponding to both the user and to the first web service, wherein the data is accessible on second resources controlled via the second web service.

9. The system of claim 8, wherein the user credential is obtained from a third party service.

10. The system of claim 8, wherein the user credential is obtained from a security token service or an identity management service.

11. The system of claim 8, wherein the first and second web services are web interfaces with configuration to access the first and second resources respectively.

12. The system of claim 8, wherein the first and second resources include viewing applications and storage applications.

13. The system of claim 8, wherein the access to the second web service comprises one or more of: permissions for administrators, users without delete capabilities, users without application launch capabilities, and users with limited access capabilities.

14. The system of claim 8, wherein the at least one of the web service credentials provided to the second provider is a web service credential with limited access permissions.

15. A non-transitory computer readable medium comprising computer-readable code, which when executed on a processor of a computing system, cause the computing system to:
obtain a user credential comprising identity for a user;
provide, to a first provider of web services, the user credential;
secure access to a first web service and to associated web service credentials, the access based at least in part of the user credential, wherein:
the web service credentials are associated with the user credential; and
the web service credentials comprise access rights to first resources;
provide, to a second provider of web services, the user credential and a copy of the web service credentials; and
secure access to a second web service and to data corresponding to both the user and to the first web service, wherein the data is accessible on second resources controlled via the second web service.

16. The non-transitory computer readable medium of claim 15, wherein the user credential is obtained from a third party service.

17. The non-transitory computer readable medium of claim 15, wherein the user credential is obtained from a security token service or an identity management service.

18. The non-transitory computer readable medium of claim 15, wherein the first and second web services are web interfaces with configuration to access the first and second resources respectively.

19. The non-transitory computer readable medium of claim 15, wherein the first and second resources include viewing applications and storage applications.

20. The non-transitory computer readable medium of claim 15, wherein the access to the second web service comprises one or more of: permissions for administrators, users without delete capabilities, users without application launch capabilities, and users with limited access capabilities.

* * * * *